(12) United States Patent
Nagai et al.

(10) Patent No.: US 7,775,694 B2
(45) Date of Patent: Aug. 17, 2010

(54) VEHICLE INTERIOR ILLUMINATION LAMP UNIT

(75) Inventors: Kentaro Nagai, Shizuoka-ken (JP); Yoshihito Masuko, Shizuoka-ken (JP); Yusuke Nakayama, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 175 days.

(21) Appl. No.: 12/204,943

(22) Filed: Sep. 5, 2008

(65) Prior Publication Data

US 2009/0073707 A1    Mar. 19, 2009

(30) Foreign Application Priority Data

| Sep. 14, 2007 | (JP) | ............................ P2007-239316 |
| Nov. 22, 2007 | (JP) | ............................ P2007-303013 |
| May 29, 2008 | (JP) | ............................ P2008-141320 |

(51) Int. Cl.
    *B60Q 1/00*     (2006.01)

(52) U.S. Cl. ...................... 362/490; 362/365; 362/479

(58) Field of Classification Search ................. 362/490, 362/492, 493, 488, 576, 479, 147, 364, 365
See application file for complete search history.

(56) References Cited

U.S. PATENT DOCUMENTS

| 6,749,324 B2 * | 6/2004 | Nagai et al. ................. 362/490 |
| 6,799,875 B2 * | 10/2004 | Flokstra et al. ............. 362/521 |
| 7,322,722 B2 * | 1/2008 | Hartmann et al. ........... 362/365 |

FOREIGN PATENT DOCUMENTS

JP      2005-319923      11/2005

* cited by examiner

*Primary Examiner*—Gunyoung T Lee
(74) *Attorney, Agent, or Firm*—Finnegan, Henderson, Farabow, Garrett & Dunner, L.L.P.

(57) ABSTRACT

A vehicle interior illumination lamp unit includes: a designed unit disposed on a lower side of a ceiling plate of a vehicle; and a functional unit disposed on an upper side of the ceiling plate of the vehicle and coupled to the designed unit. A spacer insertion space is provided on an outside of an operation plate of the functional unit, and an insertion plate portion of the spacer is inserted into the spacer insertion space, whereby engagement between an engagement hook and an engaged portion is inhibited from being released by an impact.

6 Claims, 18 Drawing Sheets

VEHICLE INTERIOR ILLUMINATION LAMP UNIT

CROSS REFERENCE TO RELATED APPLICATION

This application is based upon and claims the benefits of priority from Japanese Patent Application Nos. 2007-239316 filed on Sep. 14, 2007, 2007-303013 filed on Nov. 22, 2007, and 2008-141320 filed on May 29, 2008, the entire contents of which are incorporated herein by reference.

BACKGROUND OF THE INVENTION

1. Field of the Invention

The present invention relates to a vehicle interior illumination lamp unit provided on a ceiling portion of a vehicle.

2. Description of the Related Art

Heretofore, there has been known a vehicle interior illumination lamp unit in which a designed unit provided on an interior side and a functional unit provided on an exterior side are engaged with each other while sandwiching a ceiling plate in a vehicle interior therebetween (refer to Japanese Patent Laid-Open No. 2005-319923). In this vehicle interior illumination lamp unit, engagement hooks are provided, which are provided on a side surface of the designed unit and protrude sideward. Moreover, an engaged portion is provided, which is provided on the functional unit in a bridged manner in a direction parallel to the ceiling plate and has repellency. Then, the engagement hooks are composed so as to engage with the engaged portion. Specifically, the engaged portion gets over the engagement hooks in a warped state, and the engaged portion that has got over the engagement hooks is then recovered from such a warp owing to the repellency thereof, whereby both of the engagement hooks and the engaged portion engage with each other.

SUMMARY OF THE INVENTION

However, for example, in the case of receiving a strong impact when a curtain airbag and the like are inflated, there has been a possibility that the engaged portion of the functional unit may be warped to thereby release such coupling between the designed unit and the functional unit. Therefore, there has been a possibility that there may occur a malfunction that the designed unit falls off and scatters in the vehicle interior.

In this connection, it is an object of the present invention to provide a vehicle interior illumination lamp unit, in which the coupling between the designed unit and the functional unit is not released even if receiving the strong impact, thus making it possible to prevent the designed unit from falling off and scattering in the vehicle interior.

An aspect of the present invention is a vehicle interior illumination lamp unit, comprising: a designed unit disposed on a lower side of a ceiling plate of a vehicle; a functional unit disposed on an upper side of the ceiling plate and assembled with the designed unit in a state of sandwiching the ceiling plate therebetween by being coupled to the designed unit through an attachment hole formed in the ceiling plate; an engagement hook provided on a side plate of the designed unit, the engagement hook protruding sideward; an elastically deformable operation plate provided in the functional unit, having an engaged portion engaged with the engagement hook; and a spacer abutting on a surface of the operation plate, the surface being opposite with the a surface opposite to the side plate, and the spacer inhibiting the engaged portion from being released from the engagement hook.

In the vehicle interior illumination lamp unit according to the present invention, the spacer may include an engagement portion for dropout prevention thereon.

Further, in the vehicle interior illumination lamp unit according to the present invention, the engagement portion for dropout prevention is preferably provided on a tip end of the spacer, the tip end facing to the designed unit side.

In the vehicle interior illumination lamp unit according to the present invention, the functional unit may be formed with a die cut hole for molding the engaged portion, and the spacer preferably covers the die cut hole.

In the vehicle interior illumination lamp unit according to the present invention, the functional unit may include a grounding bus bar, and the spacer may include a contact terminal portion formed of a conductive member and brought into contact with the grounding bus bar of the functional unit.

In the vehicle interior illumination lamp unit according to the present invention, preferably, the spacer is directly fixed to a vehicle body by a screw.

According to the present invention, it is possible to prevent the operation plate from being unexpectedly warped. Therefore, the designed unit can be prevented from falling off and scattering in the vehicle interior.

According to the present invention, it is possible to prevent the spacer from dropping off, thereby preventing the unexpected release of coupling between the designed unit and the functional unit.

According to the present invention, the engagement portion for the dropout prevention is provided on the tip end of the spacer, which faces to the designed unit side. Therefore, it is easy to detach the engagement portion for the dropout prevention from the designed unit side, leading to easiness to perform repairing work and so on.

According to the present invention, the die cut hole for molding the engaged portion is covered with the spacer. Accordingly, light from the functional unit can be prevented from leaking. Since the die cut hole is closed, the step of implementing a special process for the functional unit can be omitted.

According to the present invention, since the spacer can be utilized as a part of the ground route, a grounding wire can be eliminated.

DESCRIPTION OF THE EMBODIMENT

A description will be made below of details of vehicle interior illumination lamp units according to embodiments of the present invention.

First Embodiment

Figure 1:
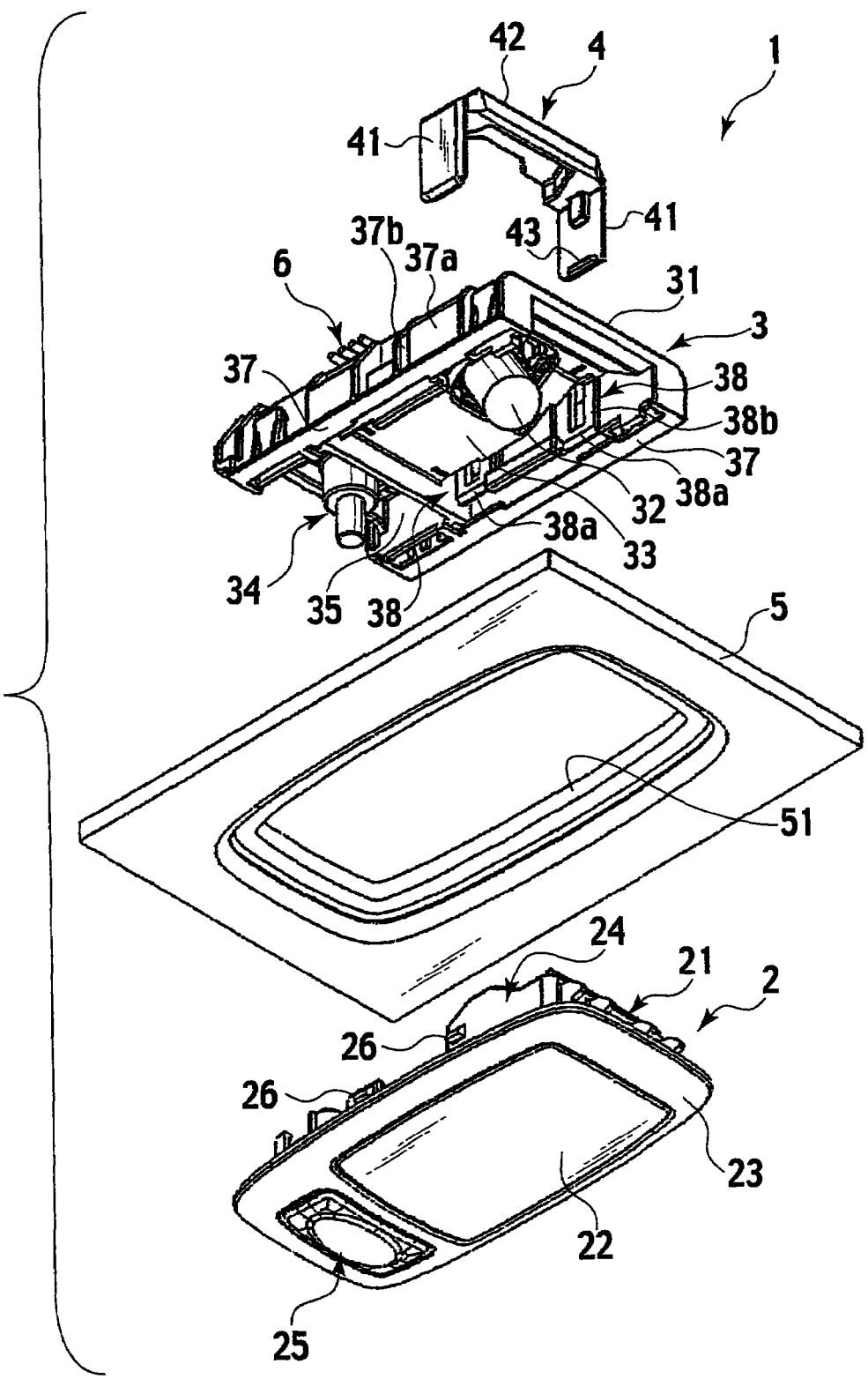
FIG. 1 is an exploded perspective view of a vehicle interior illumination lamp unit according to a first embodiment in a state viewed from below a ceiling plate.
Figure 2:
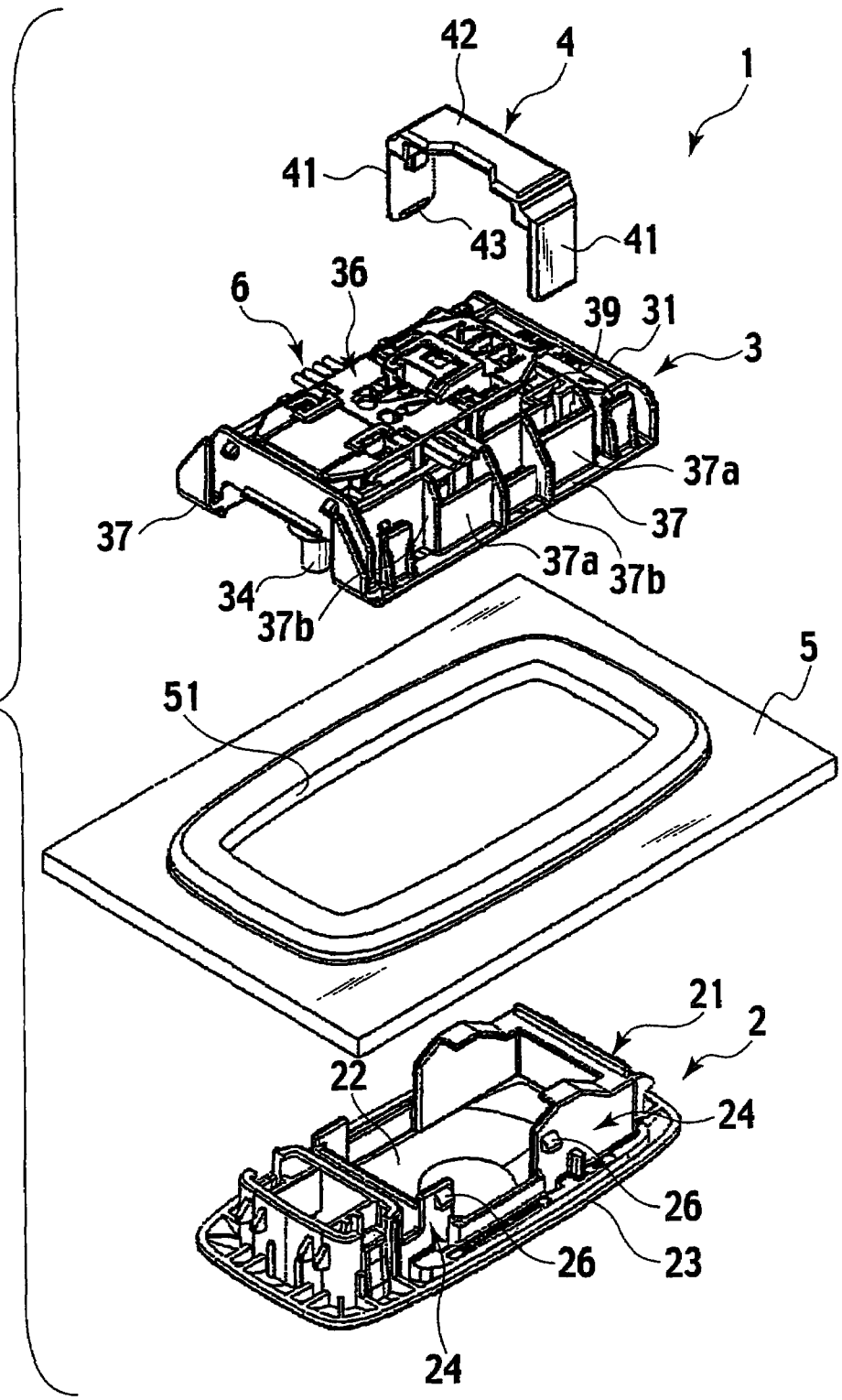
FIG. 2 is an exploded perspective view of the vehicle interior illumination lamp unit according to the first embodiment in a state viewed from above the ceiling plate.

As shown in FIG. 1 and FIG. 2, a vehicle interior illumination lamp unit 1 according to a first embodiment is schematically composed of a designed unit 2, a functional unit 3, and a spacer 4. The designed unit 2 is disposed on a lower side of a ceiling plate 5 that forms a ceiling of a vehicle. Moreover, the functional unit 3 is disposed on an upper side of the ceiling plate 5. The designed unit 2 and the functional unit 3 are coupled to each other, whereby the ceiling plate 5 is sandwiched between the designed unit 2 and the functional unit 3. In the ceiling plate 5, a substantially rectangular attachment hole 51 for coupling the designed unit 2 and the functional unit 3 to each other is formed.

The designed unit 2 includes: a base housing 21; and a transparent or translucent lens cover 22 adapted to be attachable to and detachable from a lower surface of the base housing 21. The base housing 21 includes: a rectangular frame plate portion 23 exposed to a vehicle interior side; and a protrusion portion (side plate) 24 formed along an upper-surface peripheral edge of the frame plate portion 23 and erected upward.

Moreover, a switch housing portion 25 is formed in a part (one end portion in a longitudinal direction in this embodiment) of the frame plate portion 23. The switch housing portion 25 is provided so as to be capable of being protruded and recessed in an up-and-down direction with respect to the frame plate portion 23, and houses a switch 34 of the functional unit (to be described later) 3. Hence, the switch housing portion 25 enables a pressing operation for the switch 34.

Figure 3:
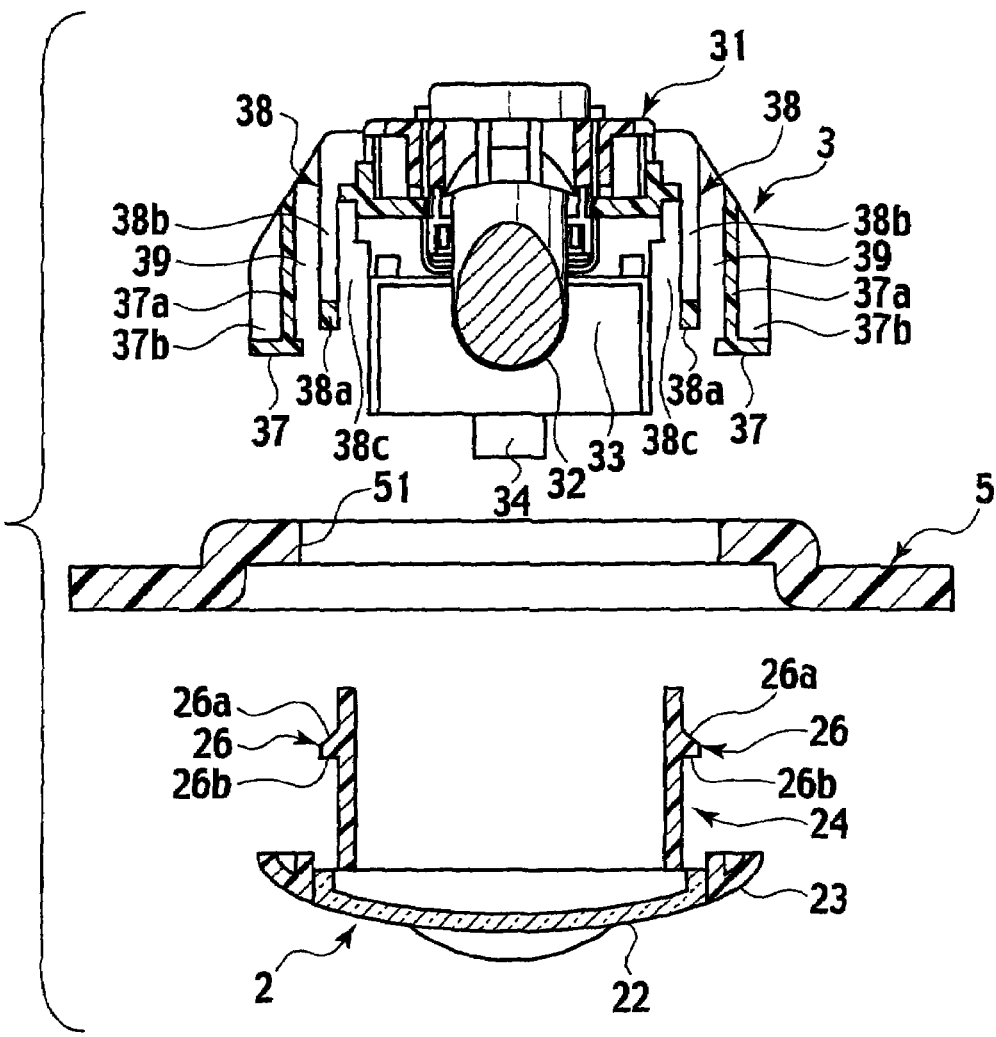
FIG. 3 is an exploded cross-sectional view of the vehicle interior illumination lamp unit according to the first embodiment.

As shown in FIG. 2, the protrusion portion 24 of the base housing 21 is a wall portion formed on an upper surface side of the frame plate portion 23 in a protruded manner so as to almost surround the lens cover 22. Two pairs of engagement hooks 26 are formed outward on a pair of opposite both side surfaces (both sides in a direction perpendicular to the longitudinal direction of the frame plate portion 23 in this embodiment) of the protrusion portion 24. As shown in FIG. 3, in each of the engagement hooks 26, a tapered surface 26a is formed in a protrusion direction of the protrusion portion 24, and an engagement surface 26b forming a right angle with respect to the side surface of the protrusion portion 24 is formed in a direction reverse to the protrusion direction.

As shown in FIG. 1, the functional unit 3 includes a housing 31 molded integrally of synthetic resin. On a lower surface side of the housing 31, there are provided: a light source disposition space 33 in which a light source 32 is disposed; and a switch disposition space 35 in which the switch 34 is disposed so as to be protruded downward. Note that, in the case where the designed unit 2 and the functional unit 3 are assembled with each other while interposing the ceiling plate 5 therebetween, the lens cover 22 is opposed to the housing 31 so as to cover the light source disposition space 33, and the switch 34 is housed in the switch housing portion 25, thus making it possible to operate the switch 34.

Moreover, as shown in FIG. 1 and FIG. 2, a connection portion 36 is provided on an upper portion of the functional unit 3. A wire harness 6 cabled on the ceiling plate 5 is connected to the connection portion 36. In the connection portion 36, wires of the wire harness 6 are press-fitted and electrically connected to contacts of a bus bar (not shown) to which the light source 32 and the switch 34 are connected.

Sandwiching plate portions 37 are formed on lower surfaces of both sides of the housing 31. The sandwiching plate portions 37 abut on both-side peripheral edge portions of the attachment hole 51 of the ceiling plate 5, and have a length equivalent to a longitudinal length of the attachment hole 51.

Moreover, on both sides of the housing 31, two pairs of operation plates 38 are provided individually at positions inward of the sandwiching plate portions 37. Each of the operation plates 38 is a substantially U-shaped plate composed of: engaged portions 38a installed laterally on lower portions thereof; and a pair of suspended portions 38b in which upper end portions are provided integrally with the housing 31. Each of the operation plates 38 has protrusion portion insertion spaces 38c in an inside thereof. The protrusion portion insertion spaces 38c make it possible to insert, into inner portions thereof, portions of the protrusion portion 24 in the designed unit 2, on which the engagement hooks 26 are formed. Moreover, the engaged portions 38a of the operation plates 38 are arranged at positions corresponding to the engagement hooks 26 of the designed unit 2.

Furthermore, on both sides of the light source disposition space 33, spacer holding walls 37a and reinforcement ribs 37b are integrally formed. The spacer holding walls 37a are formed on outsides of the operation plates 38 so as to be erected from the sandwiching plate portions 37 while being spaced from the operation plates 38 by spacer insertion spaces 39 for inserting the spacer 4 thereinto. The reinforcement ribs 37b are formed so as to be coupled to both sides of the spacer holding walls 37a in a width direction, and to be erected from the sandwiching plate portions 37. Note that similar structures to those of the above-described spacer holding walls 37a and reinforcement ribs 37b are provided also on outsides of the operation plates 38 formed in the vicinities of both sides of a portion in the housing 31, in which the switch 34 is provided.

Figure 4:
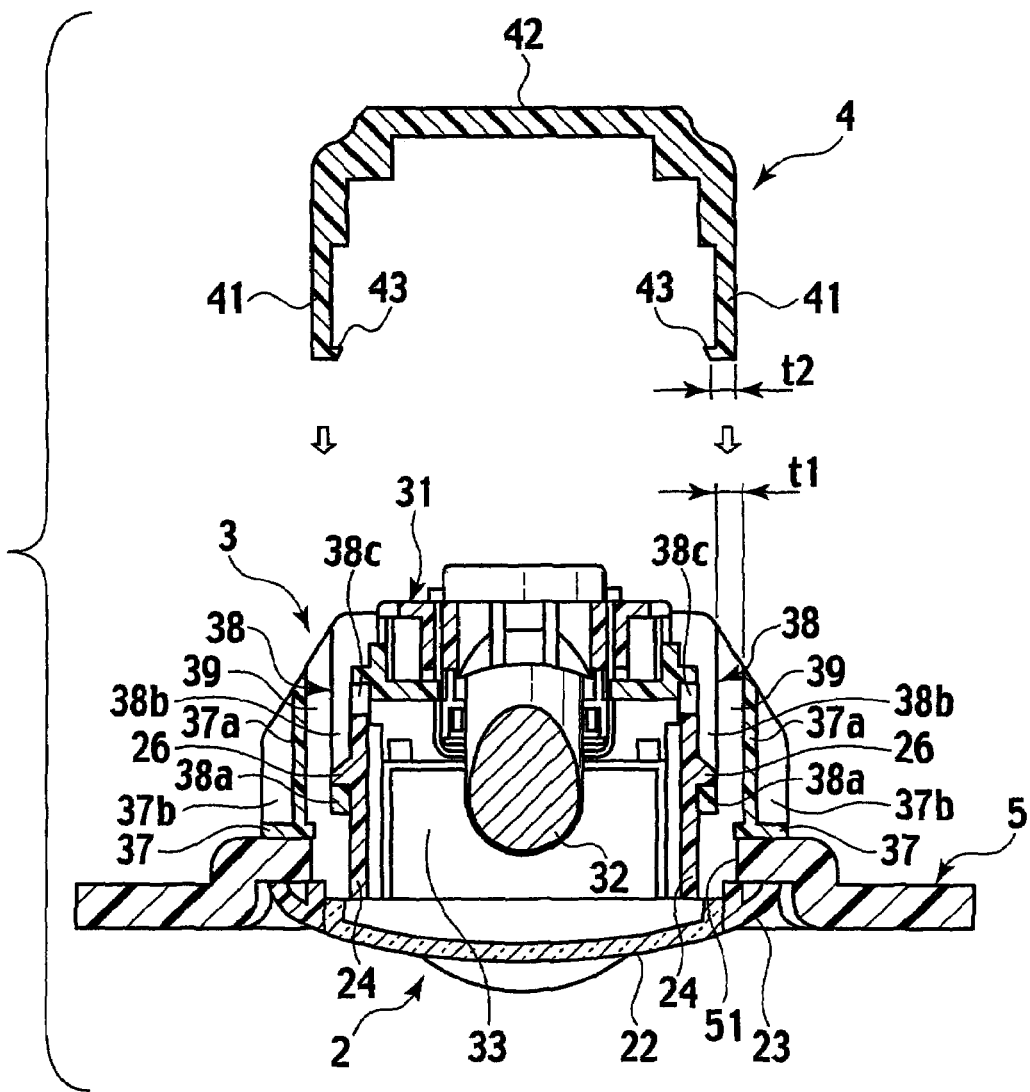
FIG. 4 is a cross-sectional view showing a state before attaching a spacer to the vehicle interior illumination lamp unit according to the first embodiment.

As shown in FIG. 4, a gap dimension t1 represents a distance between the operation plate 38 and the spacer holding wall 37a in each of the spacer insertion space 39. The gap dimension t1 is set so as to become very slightly larger than a thickness t2 of a tip end portion of an insertion plate portion 41 of the spacer (to be described later) 4.

As shown in FIG. 1, FIG. 2 and FIGS. 4 to 7, the spacer 4 is a member formed into a substantial U shape. The spacer 4 includes: a pair of the parallel insertion plate portions 41 inserted into the spacer insertion spaces 39 formed on both sides of the functional unit 3; and a coupling plate portion 42 that integrally couples upper ends of the insertion plate portions 41 to each other. On the tip end portions of the pair of insertion plate portions 41, engagement portions 43 for dropout prevention, which are slightly protruded inward so as to be directed to each other, are provided. The engagement portions 43 for the dropout prevention are engaged with lower ends of the engaged portions 38a when the insertion plate portions 41 are inserted into the spacer insertion spaces 39 of the functional unit 3. The gap dimension t1 is set so that the insertion plate portions 41 can be inserted into the spacer insertion spaces 39, and is set to an extent that the engagement hooks 26 are not released by the fact that the engaged portions 38a are warped when the engagement portions 43 for the dropout prevention are engaged with the lower ends of the engaged portions 38a.

For example, as shown in FIG. 1, in the ceiling plate 5, the vicinity of an opening edge of the attachment hole 51 has a shape of, over the peripheral direction, being slightly erected upward, bent inward, and thereby recessed upward. Therefore, when the designed unit 2 is attached to the ceiling plate 5, the designed unit 2 is suppressed from protruding downward from the ceiling plate 5, whereby an appearance of the ceiling plate 5 when the designed unit 2 is attached thereto is made to be favorable.

Next, a description will be made of an attachment procedure of the vehicle interior illumination lamp unit 1 according to the first embodiment.

As shown in FIG. 1 to FIG. 3, the protrusion portion 24 of the designed portion 2 is fitted from below into the attachment hole 51 of the ceiling plate 5. From above the attachment hole 51 of the ceiling plate 5, the functional unit 3 is made to cover the designed unit 2 in a corresponding manner. As a result, the light source 32 of the functional unit 3 faces to the lens cover 22 of the designed unit 2, and the switch 34 of the functional unit 3 is housed in the switch housing portion 25 of the designed unit 2.

The protrusion portion 24 is inserted into the protrusion portion insertion spaces 38c. In this case, the tapered surfaces 26a of the engagement hooks 26 go deeply into the protrusion portion insertion spaces 38c while elastically deforming outward the engaged portions 38a of the operation plate 38. After the engagement hooks 26 pass through the engaged portions 38, the engaged portions 38a return to an original state thereof. As this time, as shown in FIG. 4, the engagement surfaces 26b of the engagement hooks 26 abut on upper surfaces the engaged portions 38a. Hence, a state is brought, where the coupling between the designed unit 2 and the functional unit 3 is not released even if a load is applied thereto in a direction of releasing the coupling concerned.

Figure 5:
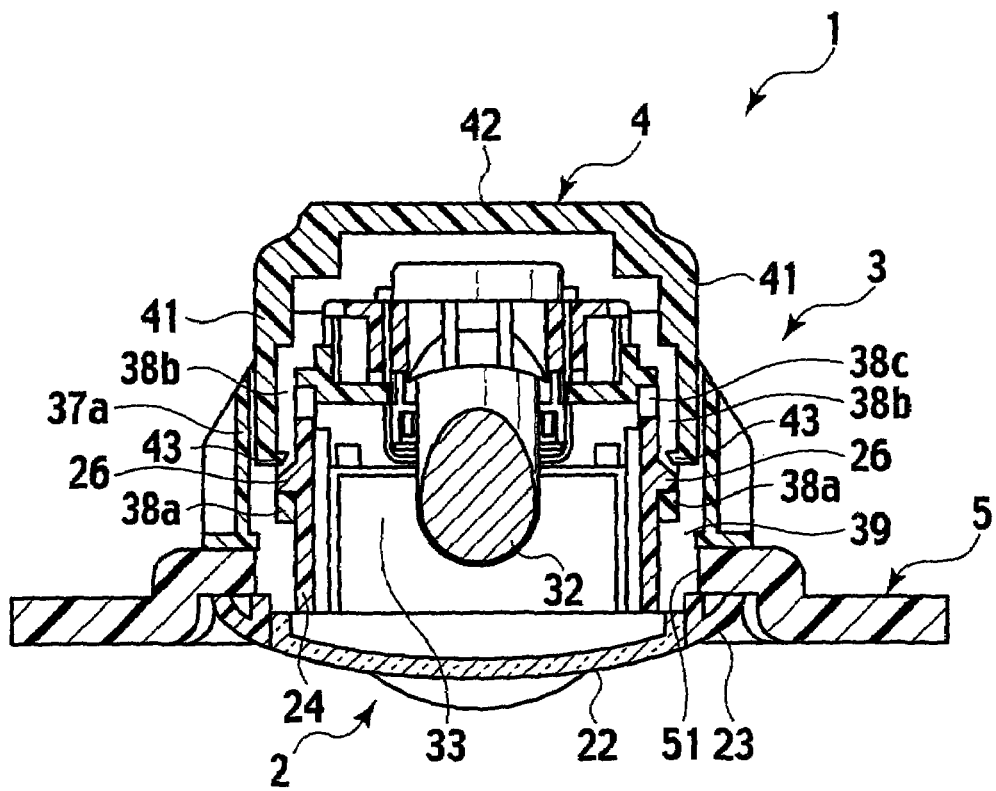
FIG. 5 is a cross-sectional view showing a state of attaching the spacer to the vehicle interior illumination lamp unit according to the first embodiment.
Figure 6:
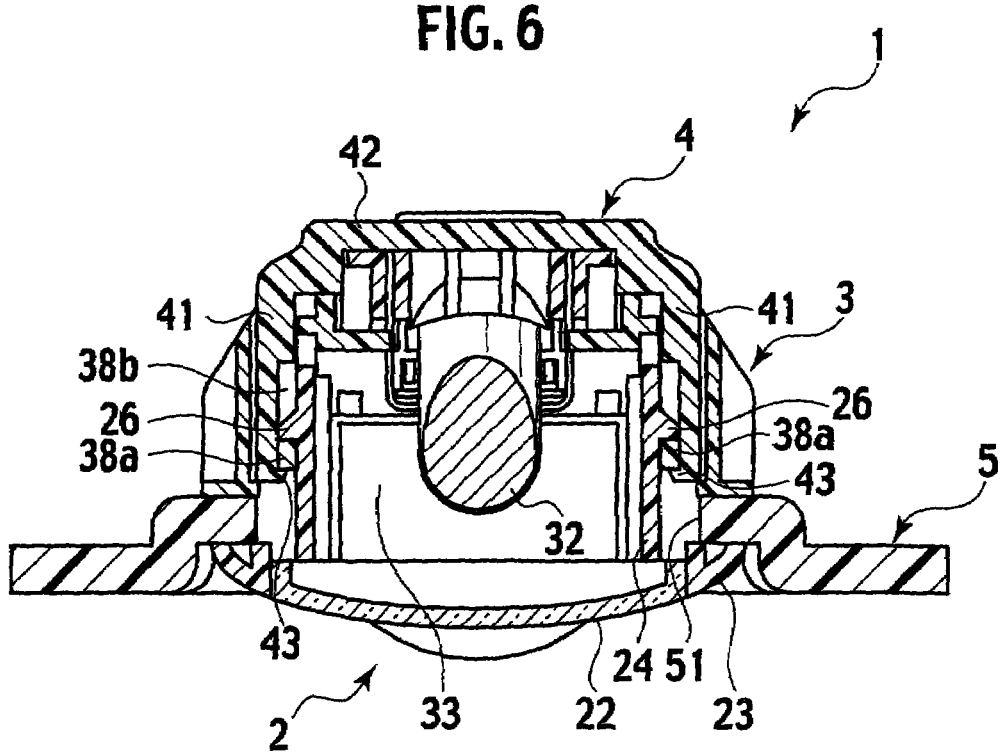
FIG. 6 is a cross-sectional view showing a state of having attached the space to the vehicle interior illumination lamp unit according to the first embodiment.

Next, as shown in FIG. 4 and FIG. 5, the insertion plate portions 41 of the spacer 4 are inserted into the spacer insertion spaces 39 of the functional unit 3. Then, the engagement portions 43 for the dropout prevention, which are protruded on the insides of tip end portions of the spacer insertion spaces 39, slide on the tapered surfaces 26a of the engagement hooks 26, go deeply into the spacer insertion spaces 39 in a state of being elastically deformed somewhat outward, and enter under the engaged portions 38a when the engagement portions 43 for the dropout prevention get over the engaged portions 38a, whereby the spacer 4 is held on the functional unit 3 (refer to FIG. 6). In such a way, the attachment of the vehicle interior illumination lamp unit 1 to the ceiling plate 5 is completed.

Figure 7:
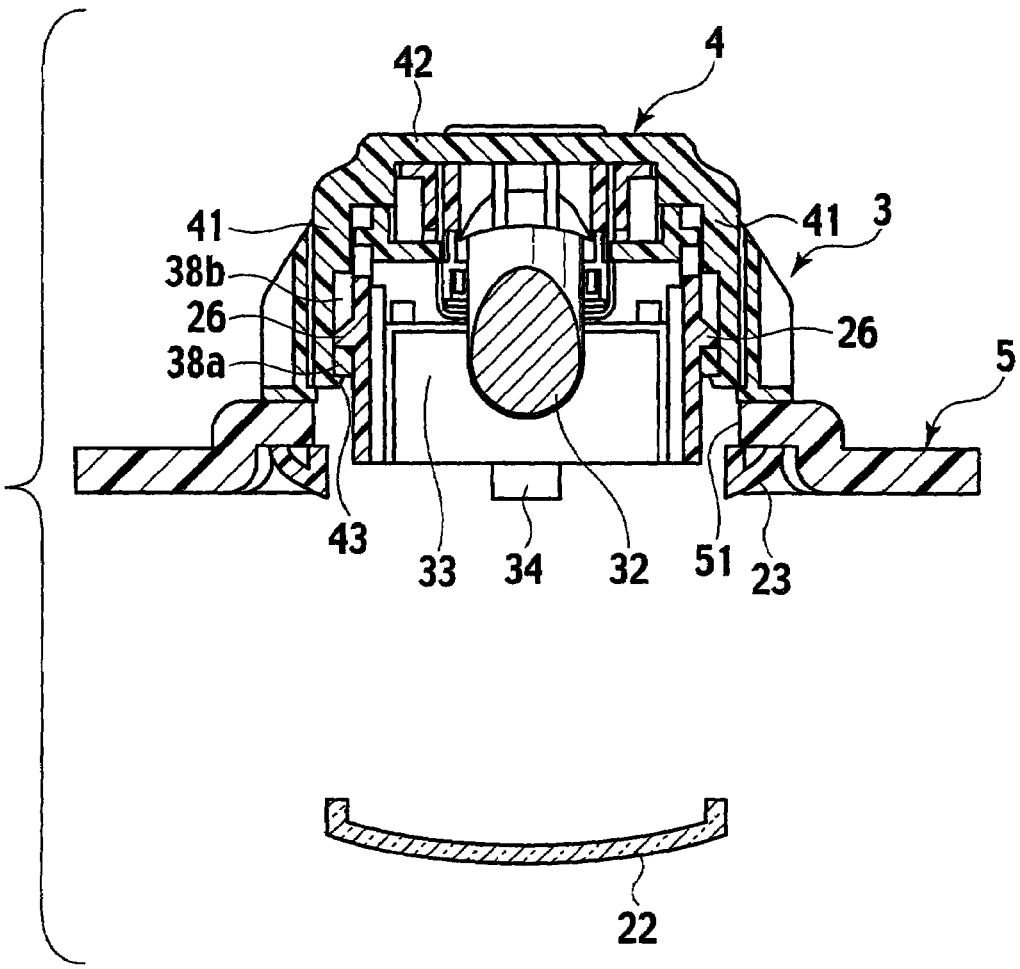
FIG. 7 is a cross-sectional view showing a method for detaching the vehicle interior illumination lamp unit according to the first embodiment.
Figure 8:
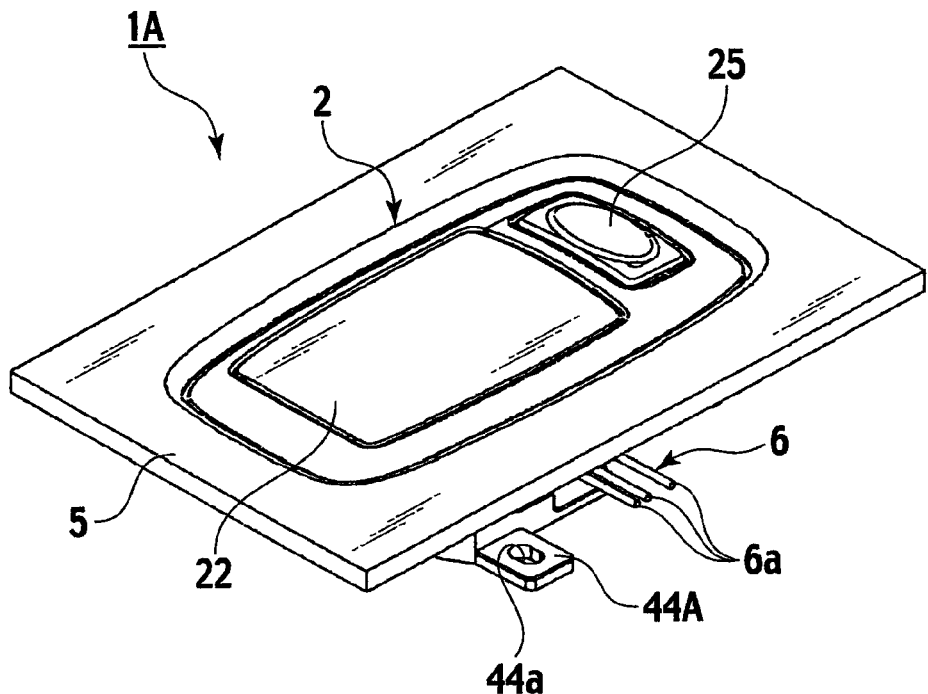
FIG. 8 is a perspective view of a vehicle interior illumination lamp unit according to a second embodiment in a state viewed from below the ceiling plate.
Figure 9:
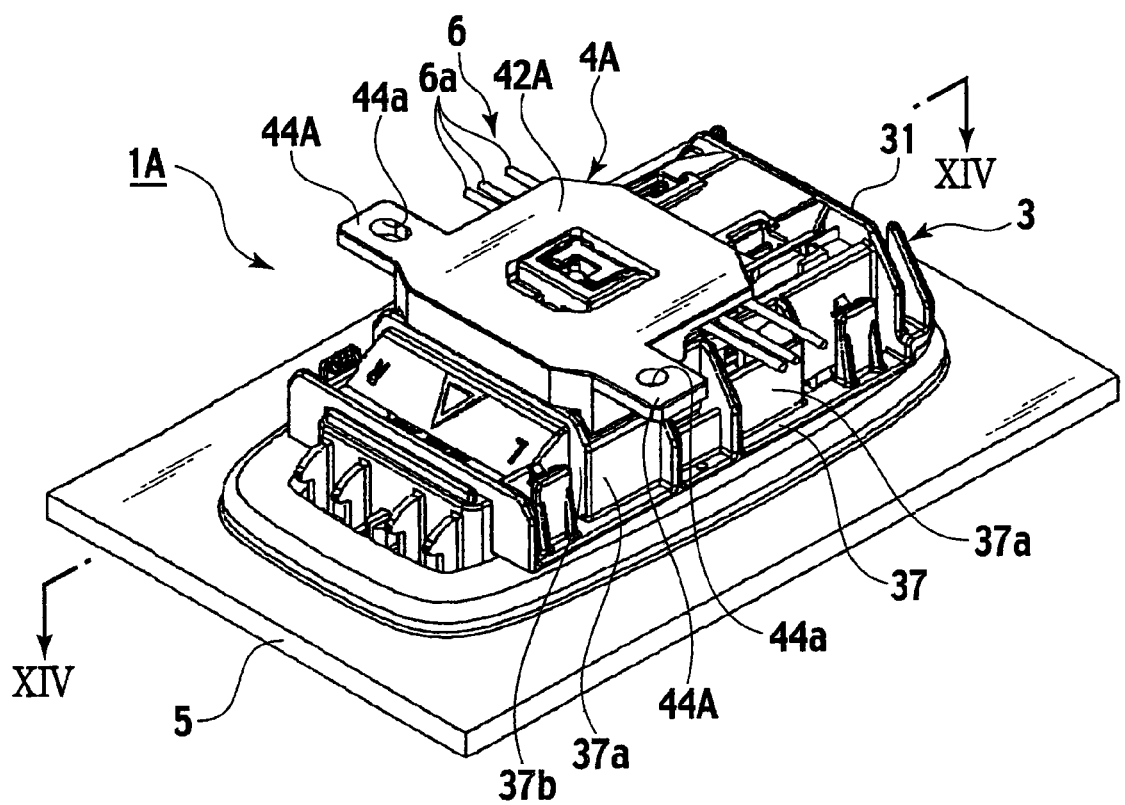
FIG. 9 is a perspective view of the vehicle interior illumination lamp unit according to the second embodiment in a state viewed from above the ceiling plate.
Figure 10:
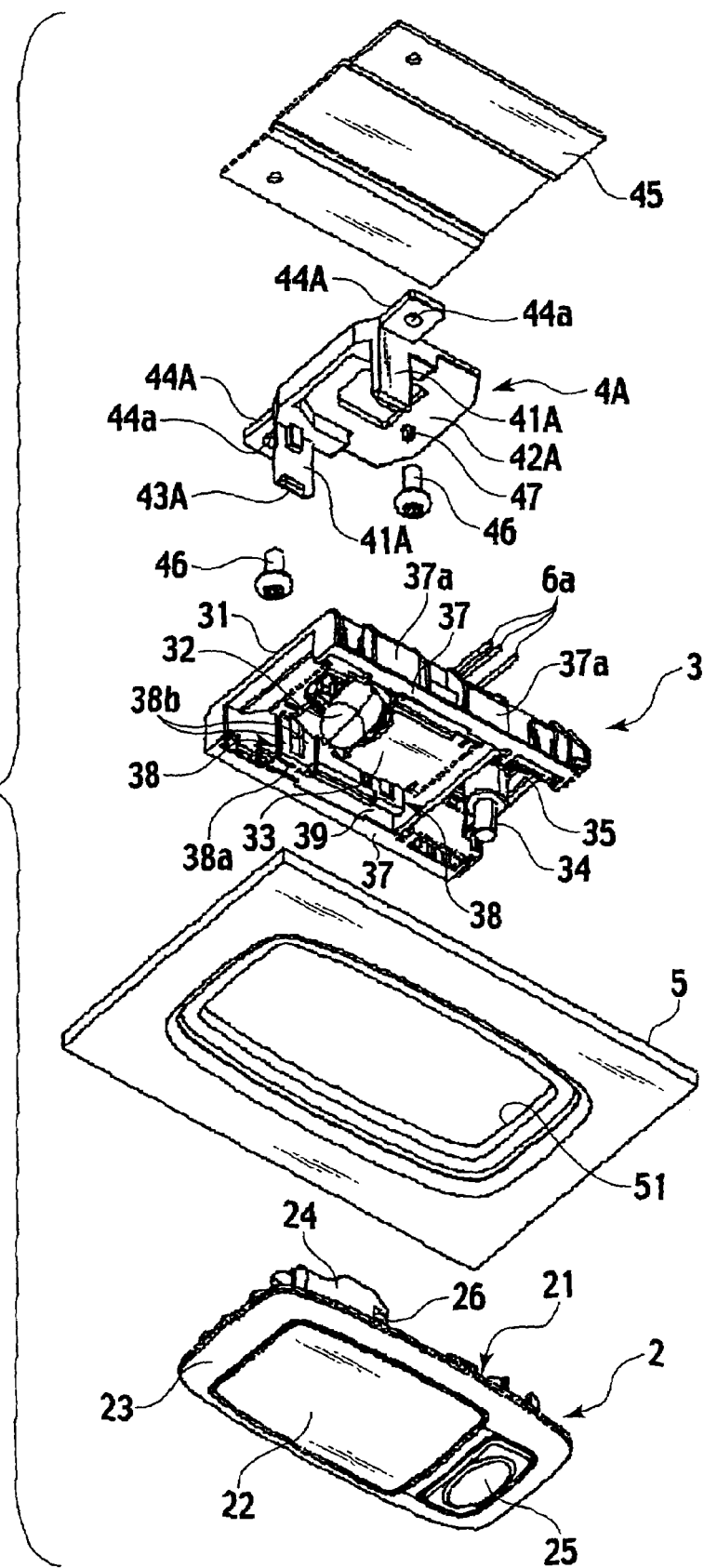
FIG. 10 is an exploded perspective view showing a state of looking up at the vehicle interior illumination lamp unit according to the second embodiment from below the ceiling plate.
Figure 11:
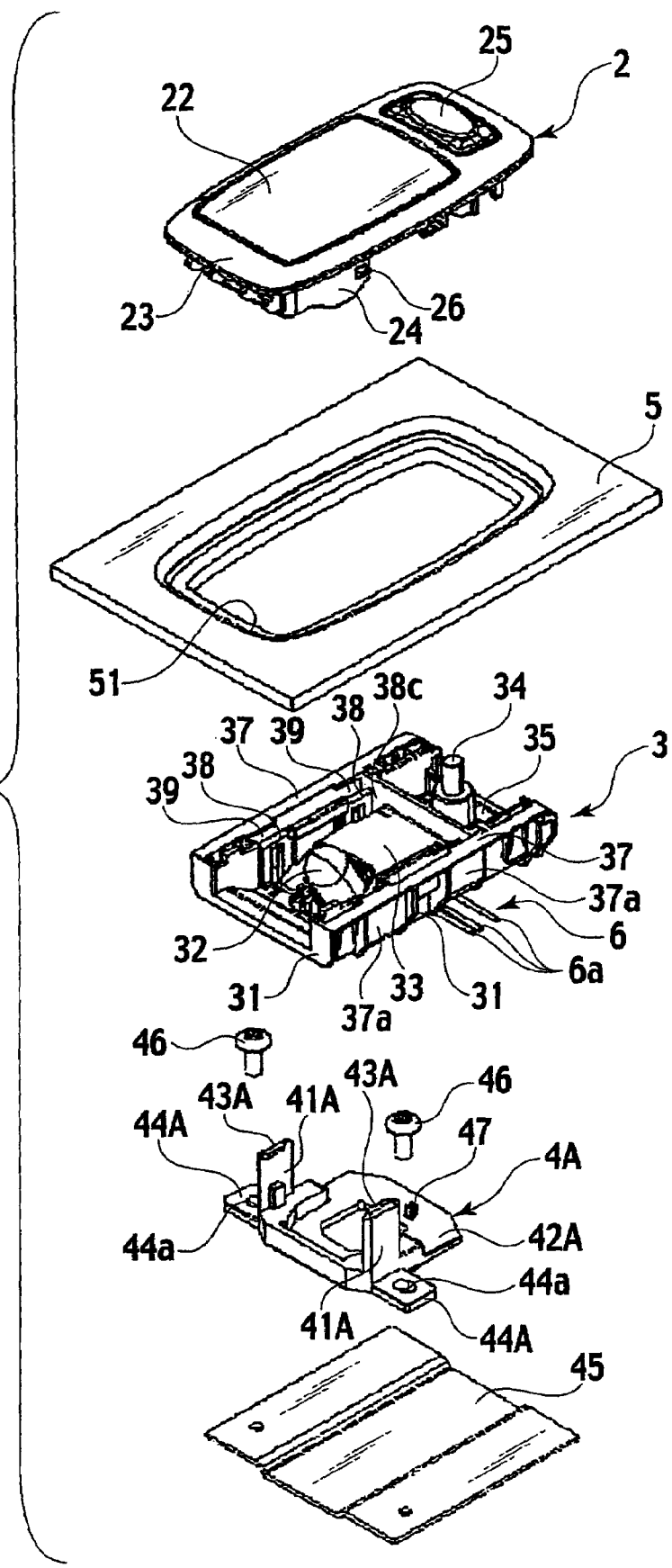
FIG. 11 is an exploded perspective view showing a state of looking down at the vehicle interior illumination lamp unit according to the second embodiment from above the ceiling plate.

Note that, in order to detach the vehicle interior illumination lamp unit 1 attached as described above, the lens cover 22 of the frame plate portion 23 is detached as shown in FIG. 7. Thereafter, by using a jig (not shown), the engagement portions 43 for the dropout prevention are operated from the engaged portions 38a, whereby the spacer 4 can be detached. Next, the engaged portions 38a are warped outward by using the jig, whereby such coupling between the engagement hooks 26 and the engaged portions 38a is released, thus making it possible to release the coupling between the designed unit 2 and the functional unit 3. Note that, in the case of releasing the coupling between the engagement hooks 26 and the engaged portions 38a, the engagement hooks 26 and the engaged portions 38a may be detached from each other simultaneously on four spots where they are coupled to each other, or may be detached from each other one spot by one spot.

In the vehicle interior illumination lamp unit 1 of this embodiment, the spacer 4 is inserted into the spacer insertion spaces 39, whereby the engaged portions 38a are inhibited from being warped and deformed in the direction of being detached from the engagement hooks 26. For example, even in the case where an unexpected load is applied to the vehicle interior illumination lamp unit 1 following an inflation of a curtain airbag and the like, such warp and deformation are inhibited. Hence, the coupling between the designed unit 2 and the functional unit 3 can be prevented from being released, and the designed unit 2 can be prevented from falling off in the vehicle interior.

Moreover, the engagement portions 43 for the dropout prevention are protruded on the spacer 4, and accordingly, the spacer 4 can be prevented from coming off from the functional unit 3. Therefore, the coupled state between the designed unit 2 and the functional nit 3 can be surely maintained.

Moreover, the engagement portions 43 for the dropout prevention are provided on tip ends of the spacer 4, which face to the designed unit 2 side. Accordingly, there is an effect that it is easy to detach the engagement portions 43 for the dropout prevention from the designed unit 2 side, leading to easiness to perform repairing work and so on.

Furthermore, a configuration is adopted, in which a die cut hole for molding the engaged portions 38 in the functional unit 3 is covered with the substantially U-shaped spacer 4. Accordingly, light from the light source disposition space 33 side can be prevented from leaking onto the functional unit 3. Since the die cut hole is closed, the step of implementing a special process for the functional unit 3 can be omitted.

Second Embodiment

FIG. 8 to FIG. 15 show a second embodiment of the present invention.

As shown in FIG. 8 to FIG. 11, in the case of being compared with the vehicle interior illumination lamp unit 1 according to the above-mentioned first embodiment, a vehicle interior illumination lamp unit 1A according to the second embodiment is different therefrom in configuration of a spacer 4A, and in that a ground route is provided in an electric circuit of the functional unit 3.

Figure 12:
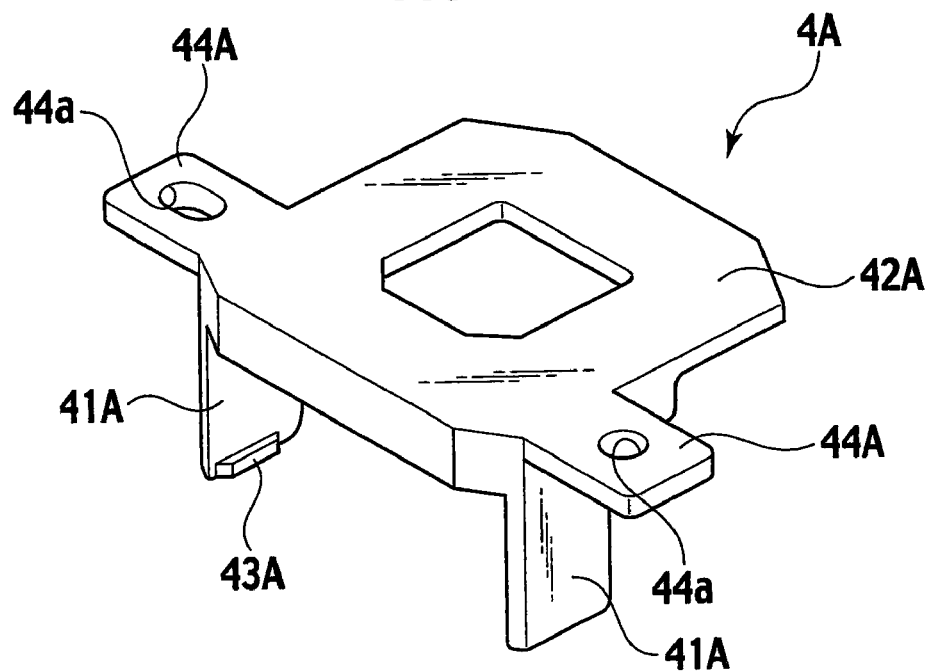
FIG. 12 is a perspective view of a spacer of the vehicle interior illumination lamp unit according to the second embodiment when viewed from an upper surface side thereof.
Figure 13:
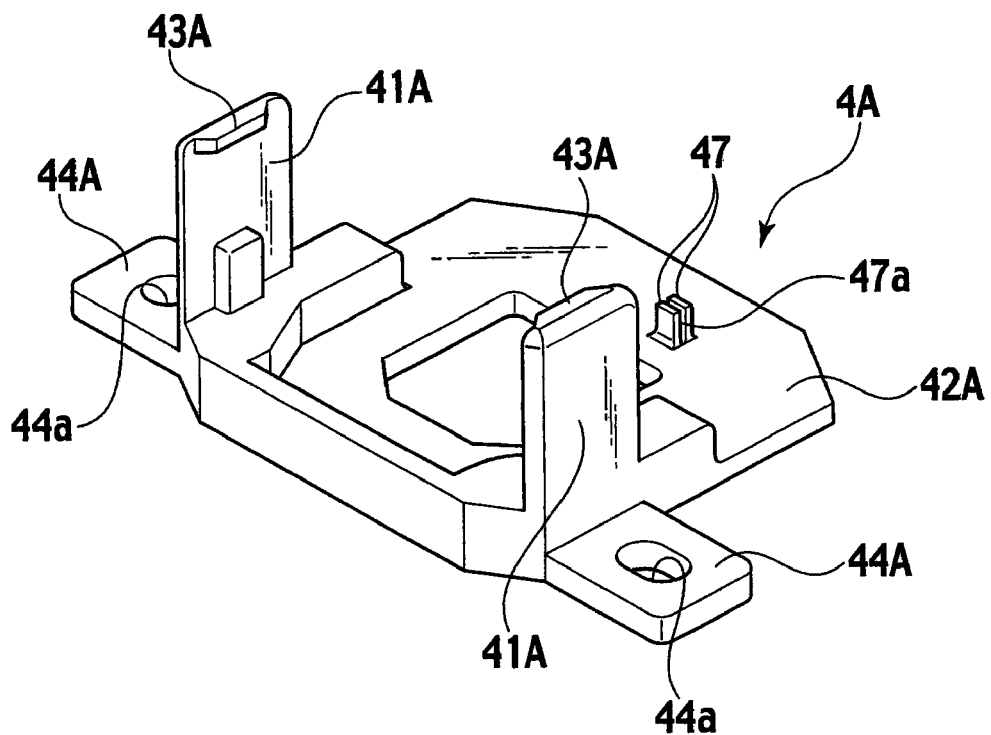
FIG. 13 is a perspective view of the spacer of the vehicle interior illumination lamp unit according to the second embodiment when viewed from a lower surface side thereof.

As shown in FIG. 12 and FIG. 13, the spacer 4A is formed of a conductive member. The spacer 4A is a substantially U-shaped member. In the spacer 4A, there are integrally provided: a pair of insertion plate portions 41A having engagement portions 43A for the dropout prevention on tip ends thereof; a coupling plate portion 42A that couples the insertion plate portions 41A to each other; and a pair of attachment plate portions 44A extended outward from the coupling plate portion 42A. In the respective attachment plate portions 44A, screw insertion holes 44a are individually formed. Screws 46 inserted into the pair of screw insertion holes 44a are screwed into a roof panel 45 that is a part of a vehicle body and is made of conductive metal, whereby the spacer 4A is fixed to the roof panel 45.

In the case of being compared with the coupling plate portion 42 of the above-mentioned first embodiment, the coupling plate portion 42A is formed with such a large dimension that covers a connection portion 36A. On a spot of the coupling plate portion 42A, which covers the connection portion 36A, a contact terminal portion 47 is protruded toward a direction of attaching the spacer 4A. The contact terminal portion 47 has a bus-bar press-fitting groove 47a (this numeral is assigned in FIG. 13 and FIG. 15).

Figure 14:
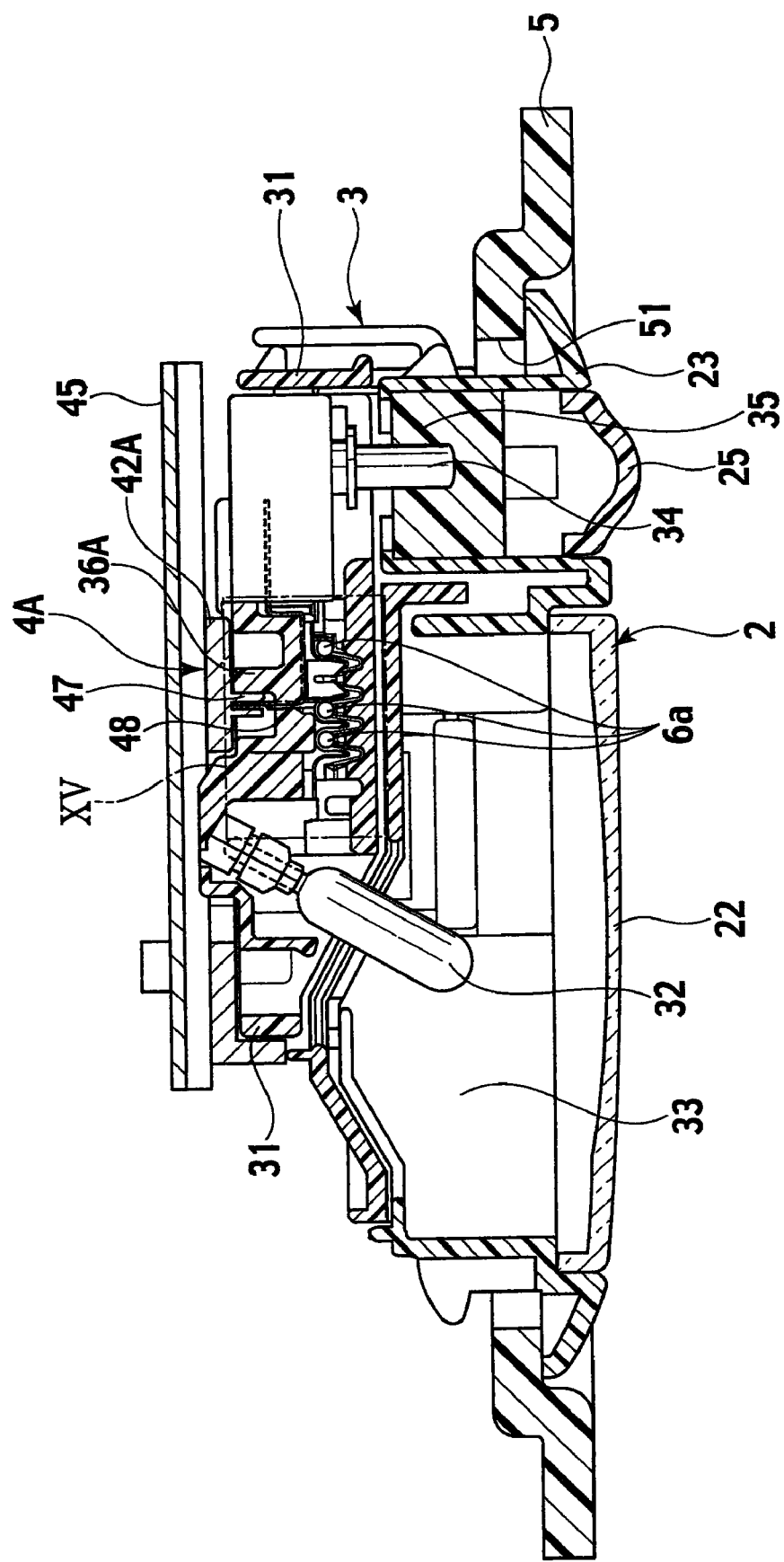
FIG. 14 is a cross-sectional view taken along a line XIV-XIV of FIG. 9.
Figure 15:
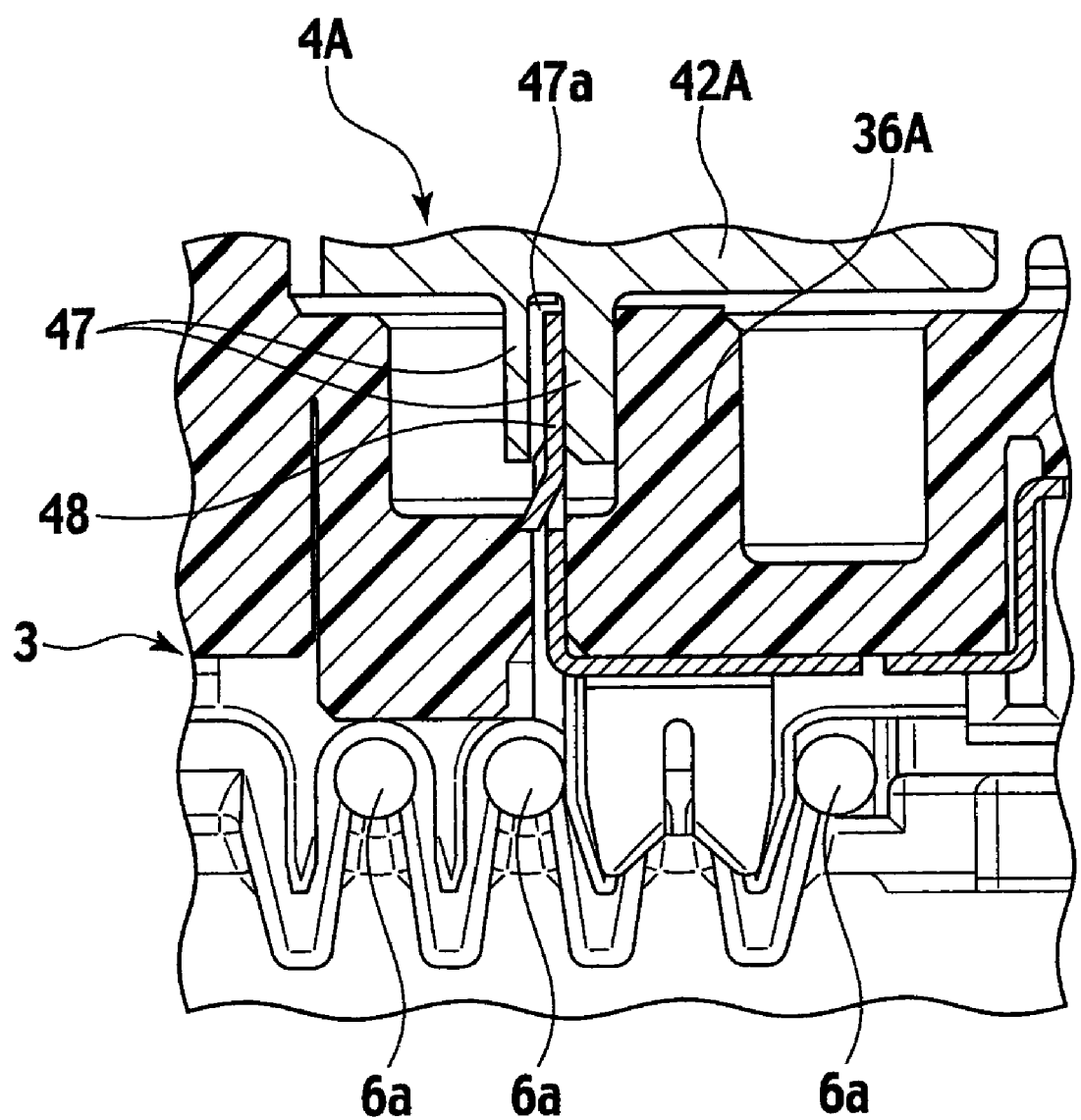
FIG. 15 is an enlarged view of a portion XV of FIG. 14.
Figure 16:
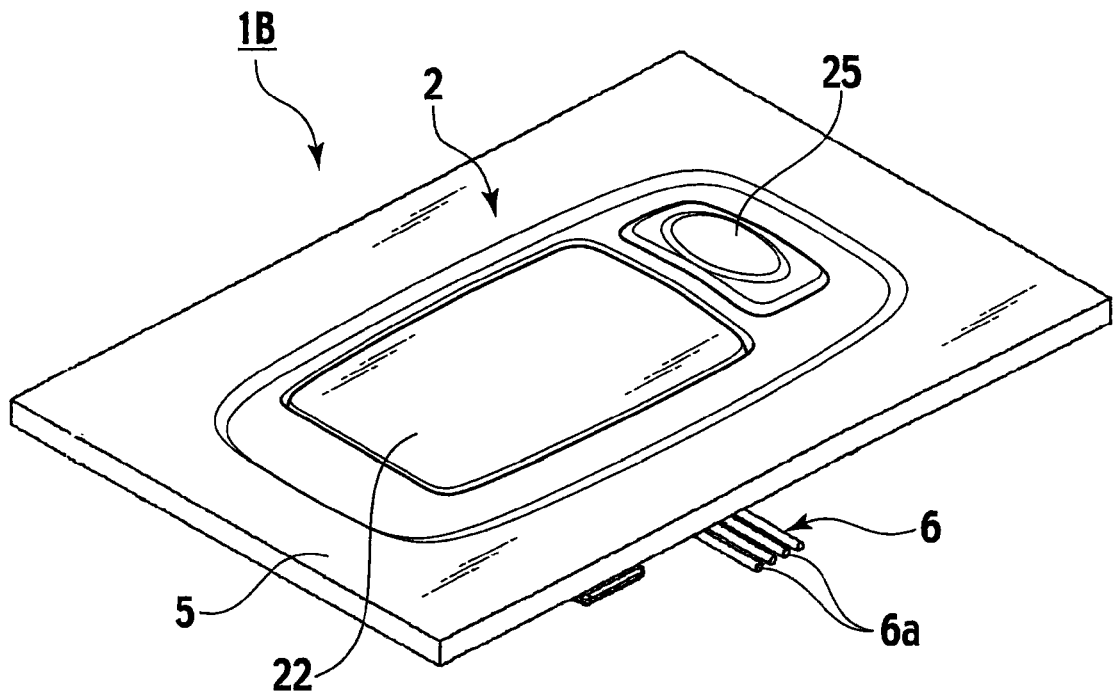
FIG. 16 is a perspective view of a vehicle interior illumination lamp unit according to a third embodiment when viewed from below the ceiling plate.
Figure 17:
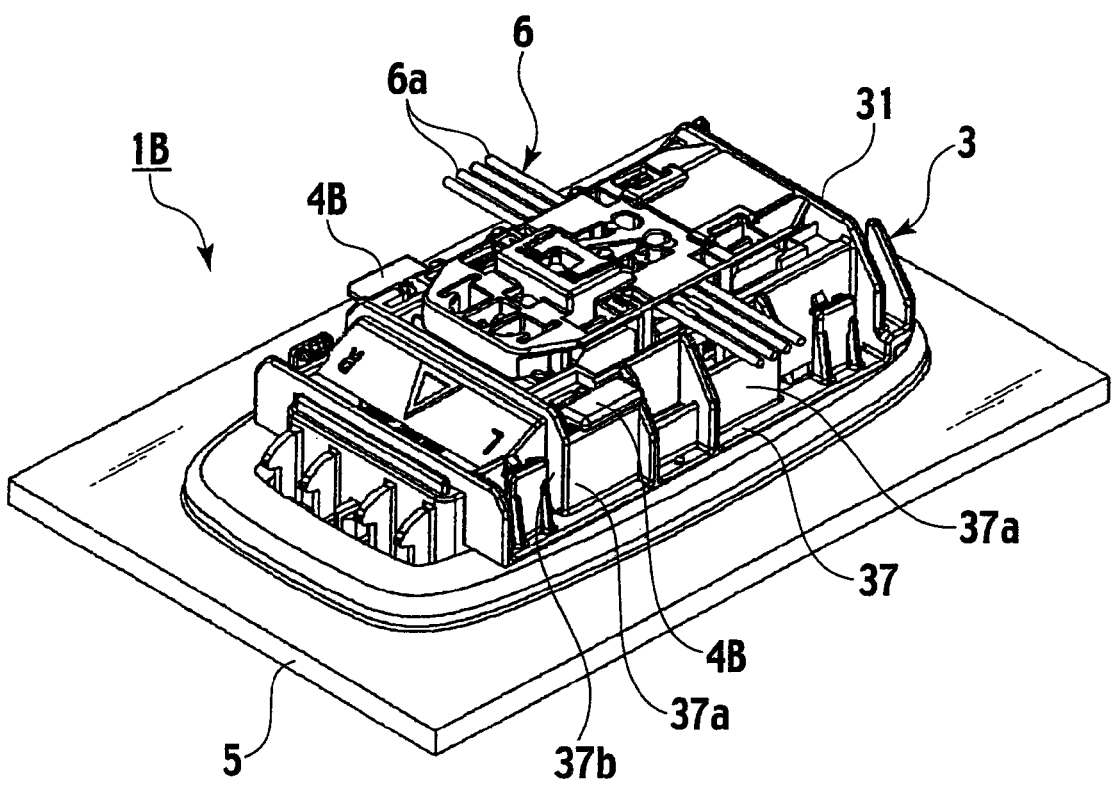
FIG. 17 is a perspective view of the vehicle interior illumination lamp unit according to the third embodiment when viewed from above the ceiling plate.
Figure 18:
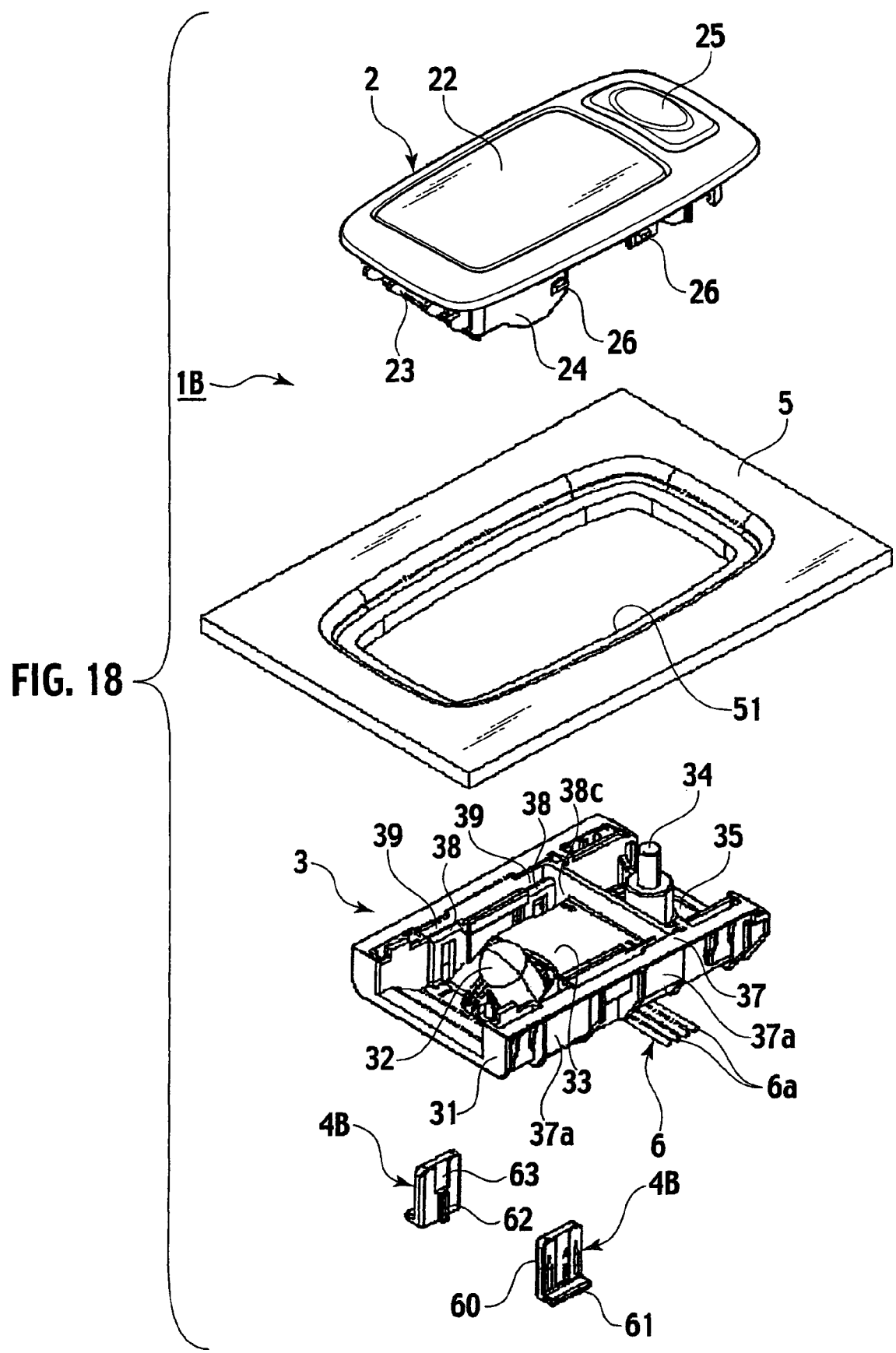
FIG. 18 is an exploded perspective view showing a state of looking up at the vehicle interior illumination lamp unit according to the third embodiment from below the ceiling plate.
Figure 19:
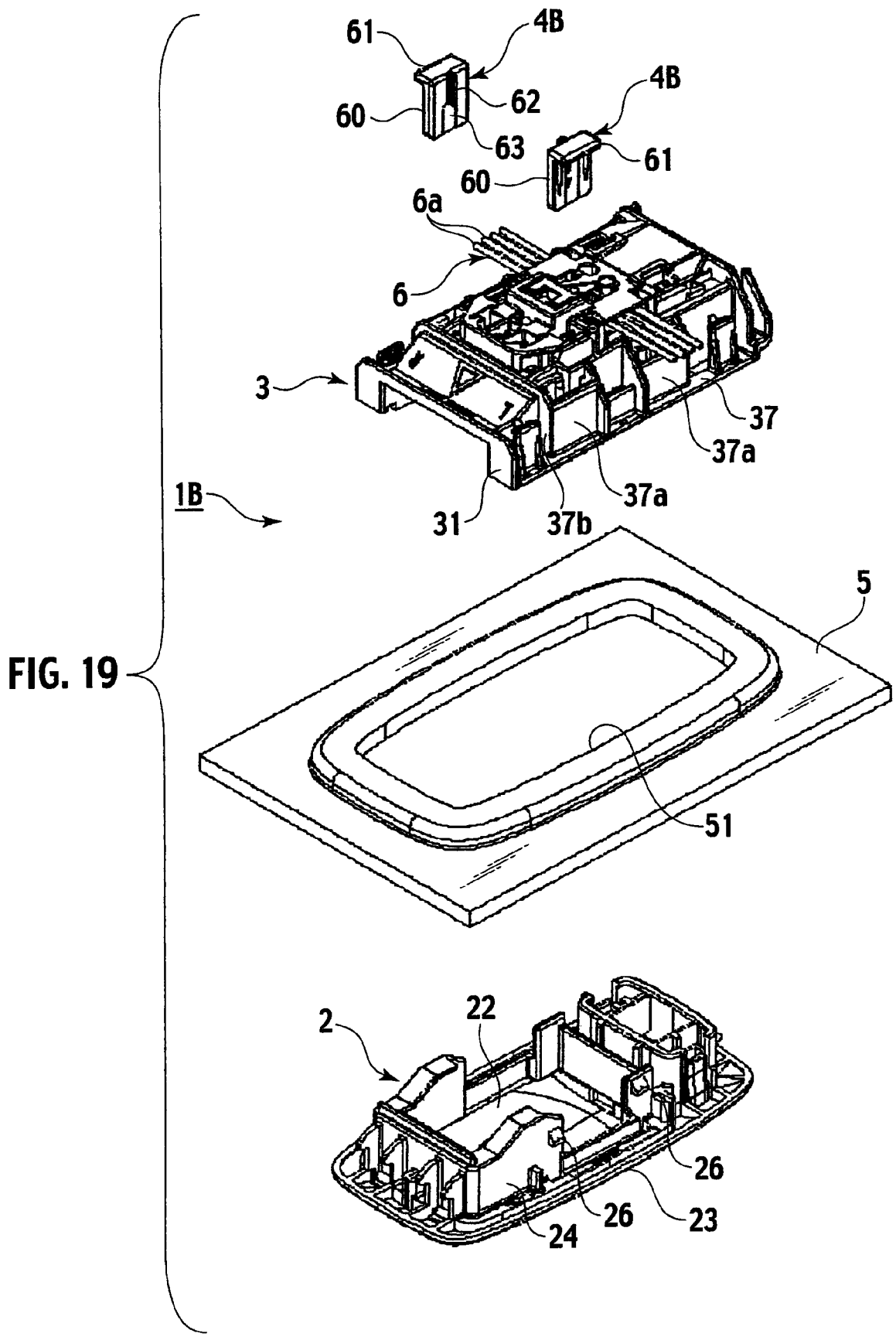
FIG. 19 is an exploded perspective view showing a state of looking down at the vehicle interior illumination lamp unit according to the third embodiment from above the ceiling plate.

Meanwhile, as shown in FIG. 14 and FIG. 15, to the connection portion 36A of the functional unit 3, totally three wires 6a of the wire harness 6, which are for a power supply and control, are electrically connected by being press-fitted thereinto. In the connection portion 36A, a grounding bus bar 48 is provided by insertion molding. A tip end portion of the grounding bus bar 48 protrudes from a surface of the connection portion 36A toward a direction where the spacer is attached. The protruding tip end portion of the grounding bus bar 48 is press-fitted into the bus-bar press-fitting groove 47a of the contact terminal portion 47 of the spacer 4A, and the grounding bus bar 48 and the spacer 4A are electrically connected to each other. Specifically, the ground route of the vehicle interior illumination lamp unit 1A is formed of the grounding bus bar 48, the spacer 4A, the screws 46, and the roof panel 45.

Other configurations are similar to those of the above-mentioned first embodiment, and accordingly, a duplicate description will be avoided. In FIG. 8 to FIG. 15, the same reference numerals are assigned to the same constituent spots as those of the first embodiment, whereby clarification of the constituent spots is achieved.

In a similar way to the vehicle interior illumination lamp unit 1 of the first embodiment, also in the vehicle interior illumination lamp unit 1A according to the second embodiment, the spacer 4A is inserted into the spacer insertion spaces 39 on the outsides of the operation plates 38. In such a way, for example, even in the case where the unexpected load is applied to the vehicle interior illumination lamp unit 1A following the inflation of the curtain airbag and the like, the engaged portions 38a are inhibited from being warped and deformed in the direction of being detached from the engagement hooks 26. Therefore, the coupling between the designed unit 2 and the functional unit 3 can be prevented from being released, and the designed unit 2 can be prevented from falling off in the vehicle interior.

Moreover, the engagement portions 43A for the dropout prevention are protruded on the spacer 4A, and accordingly, the spacer 4A can be prevented from coming off from the functional unit 3. Therefore, the coupled state between the designed unit 2 and the functional nit 3 can be surely maintained.

Moreover, the engagement portions 43A for the dropout prevention are provided on tip ends of the spacer 4A, which face to the designed unit 2 side. Accordingly, there is an effect that it is easy to detach the engagement portions 43A for the dropout prevention from the designed unit 2 side, leading to the easiness to perform the repairing work and so on.

Furthermore, a configuration is adopted, in which a die cut hole for molding the engaged portions 38 in the functional unit 3 is covered with the substantially U-shaped spacer 4A. Accordingly, the light from the light source disposition space 33 side can be prevented from leaking onto the functional unit 3. Since the die cut hole is closed, the step of implementing the special process for the functional unit 3 can be omitted.

In addition, in the second embodiment, the spacer 4A has the contact terminal portion 47 formed of the conductive member and brought into contact with the grounding bus bar 48 of the functional unit 3. Hence, in the second embodiment, since the spacer 4A can be utilized as a part of the ground route, a grounding wire of the wire harness 6 can be eliminated.

In the second embodiment, the spacer 4A is directly fixed to the roof panel 45 by the screws 46. Hence, heat of the grounding bus bar 48 can be dissipated to the vehicle body side. In particular, if the spacer 4A is formed of a highly thermal conductive material, then the heat of the grounding bus bar 48 can be effectively dissipated to the vehicle body side. Moreover, the ceiling plate 5 is supported on the roof panel 45 while interposing the vehicle interior illumination lamp unit 1 and the spacer 4A therebetween, and accordingly, substantial rigidity of the ceiling plate 5 is enhanced.

In the second embodiment, the contact terminal portion 47 protruding toward the spacer attaching direction is provided on the spacer 4A, and the grounding bus bar 48 protruding toward such an attached direction of the spacer is provided on the connection portion 36A of the functional unit 3. Hence, the contact terminal portion 47 and the grounding bus bar 48 electrically contact each other in a process of attaching the spacer 4A, and therefore, it is not necessary for an operator to separately perform work of electrically contacting both of them each other.

In the second embodiment, the bus-bar press-fitting groove 47a is provided in the contact terminal portion 47, and the grounding bus bar 48 is electrically connected to the bus-bar press-fitting groove 47a by being press-fitted thereinto. Accordingly, connection reliability between the contact terminal portion 47 and the grounding bus bar 48 is high.

Third Embodiment

FIG. 16 to FIG. 22 show a third embodiment of the present invention.

As shown in FIG. 16 to FIG. 20, in the case of being compared with the vehicle interior illumination lamp unit 1 according to the above-mentioned first embodiment, a vehicle interior illumination lamp unit 1B according to the third embodiment is different therefrom only in configuration of spacers 4B.

Specifically, in the above-mentioned first embodiment, the vehicle interior illumination lamp unit 1 is composed so as to inhibit the displacement of the left and right pair of engaged portions 38a in the release direction by the single spacer 4, whereas, in the third embodiment, the vehicle interior illumination lamp unit 1B is composed so as to inhibit the displacement of the left and right pair of engaged portions 38a in the release direction by the two spaces 4B with the same configuration.

Figure 21A:
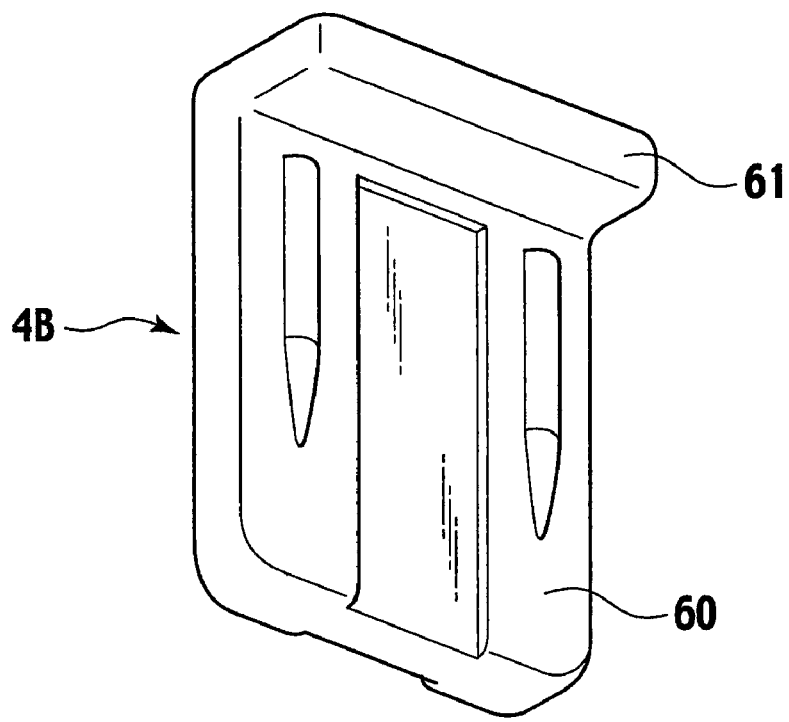
FIG. 21A is a perspective view of a spacer of the vehicle interior illumination lamp unit according to the third embodiment.
Figure 21B:
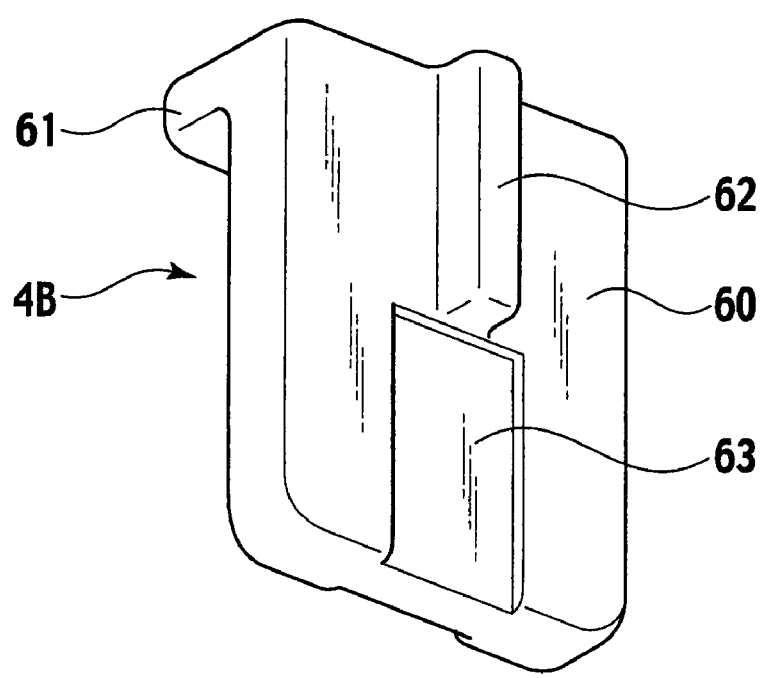
FIG. 21B is a perspective view of the same spacer when vied from an opposite side to a side in FIG. 21A.

As shown in FIGS. 21A and 21B, each of the spacers 4B has: an insertion plate portion 60; a stopper portion 61 protruded sideward from a rear end of the insertion plate portion 60 in the insertion direction; and a protruded wall portion 62 protruded along the insertion direction of the insertion plate portion 60 on a surface thereof opposite to a surface from which the stopper portion 61 is protruded. A recessed portion 63 is formed on an insertion tip end side from the protruded wall portion 62 of the insertion plate portion 60.

Other configurations than the spacers 4B are similar to those of the above-mentioned first embodiment, and accordingly, a duplicate description will be avoided. In FIG. 16 to FIG. 20 and FIG. 22, the same reference numerals are assigned to the same constituent spots as those of the first embodiment, whereby clarification of the constituent spots is achieved.

Figure 20:
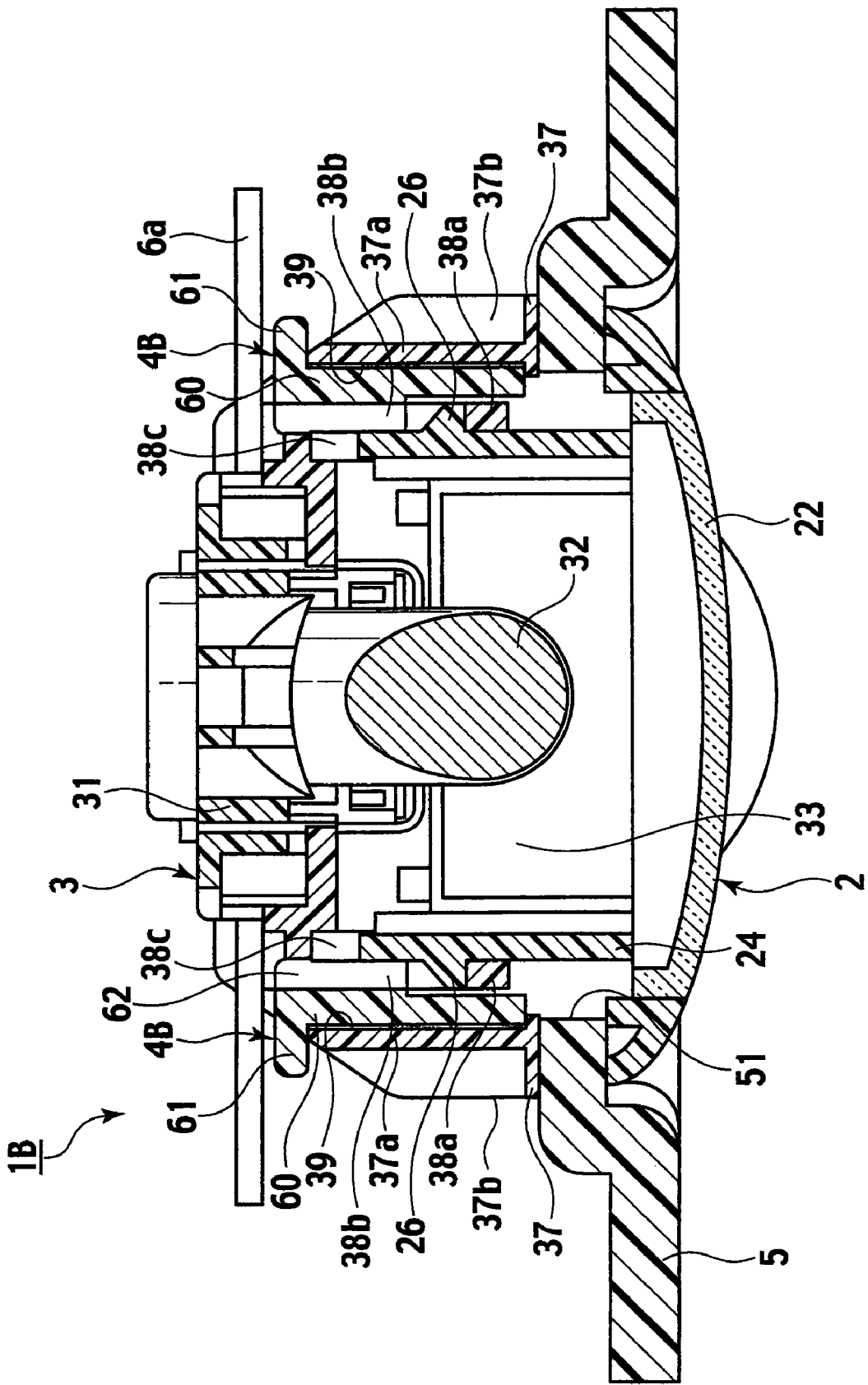
FIG. 20 is a cross-sectional view of the vehicle interior illumination lamp unit according to the third embodiment.
Figure 22:
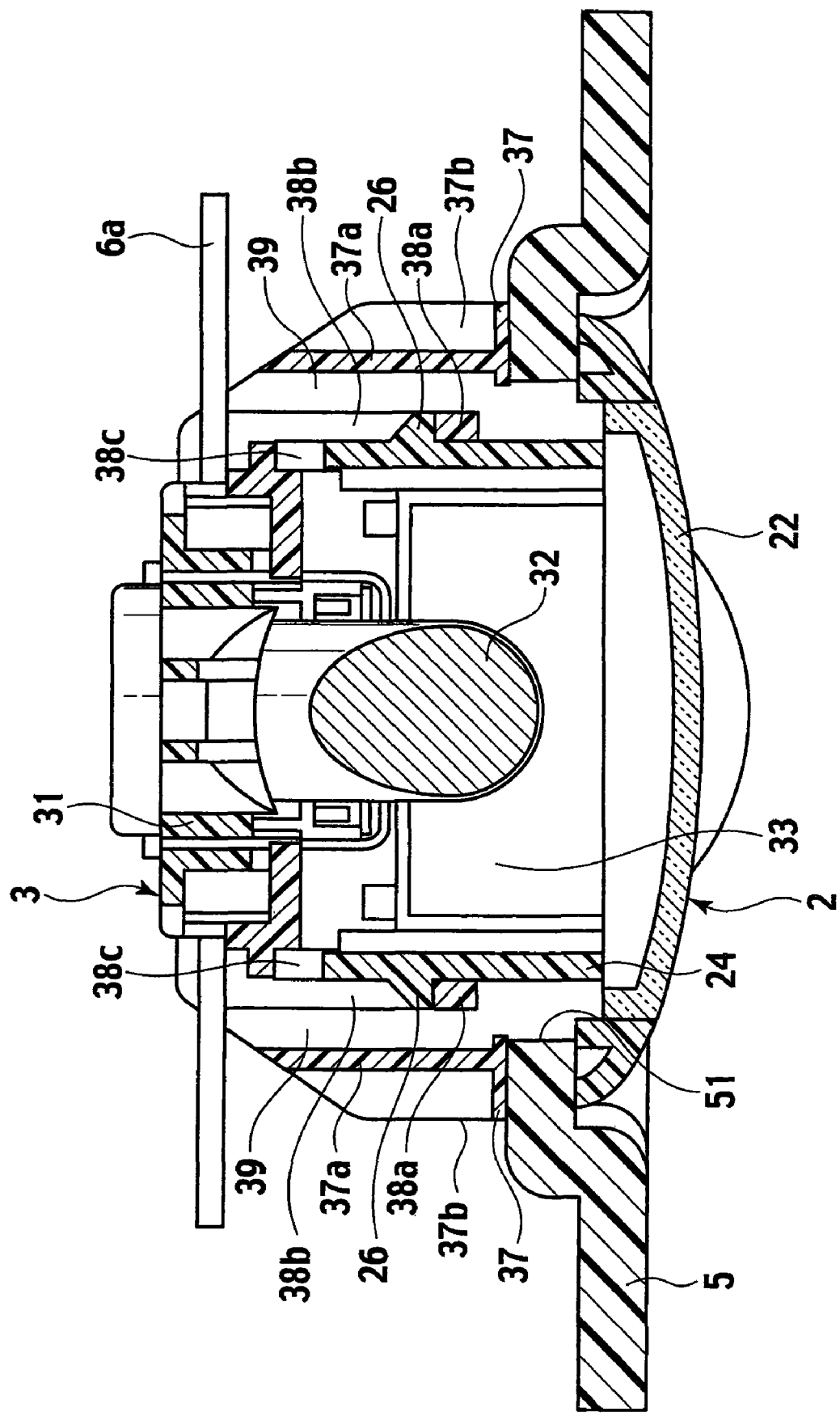
FIG. 22 is a cross-sectional view showing a state before inserting the spacers into spacer insertion spaces in a process of attaching the vehicle interior illumination lamp unit according to the third embodiment.

Next, a description will be made of an attachment procedure of the vehicle interior illumination lamp unit 1B according to the third embodiment. Similar points to those of the first embodiment will be briefly described. As shown in FIG. 22, the designed unit 2 and the functional unit 3 are assembled with each other in the up-and-down direction of the ceiling plate 5, and a state is brought, where the engagement hooks 26 of the designed unit 2 are engaged with the engaged portions 38a of the functional unit 3. From this state, the insertion plate portions 60 of the respective spacers 4B are individually inserted into the left and right spacer insertion spaces 39 of the functional unit 3. When the insertion of the insertion plate portions 60 into the spacer insertion spaces 39 advances, the protruded wall portions 62 enter in spaces on the pair of suspended portions 38b. Then, as shown in FIG. 20, when the stopper portions 61 are inserted to positions of abutting on the spacer holding walls 37a, the attachment of the vehicle interior illumination lamp unit 1B to the ceiling plate 5 is completed. When the spacers 4B are located at the positions where the insertion thereof is completed, tip end portions of the insertion plate portions 60 abut on the engaged portions 38a, and the engaged portions 38a are inhibited from moving to the release direction. Moreover, the recessed portions 63 of the insertion plate portions 60 are arranged opposite to the engagement hooks 26, and accordingly, the engagement hooks 26 are not displaced to the release direction by the insertion plate portions 60.

In a similar way to the vehicle interior illumination lamp unit 1 of the first embodiment, also in the vehicle interior illumination lamp unit 1B according to the third embodiment, the spacers 4B are inserted into the spacer insertion spaces 39 on the outsides of the operation plates 38. In such a way, for example, even in the case where the unexpected load is applied to the vehicle interior illumination lamp unit 1B following the inflation of the curtain airbag and the like, the engaged portions 38a are inhibited from being warped and deformed in the direction of being detached from the engagement hooks 26. Therefore, the coupling between the designed unit 2 and the functional unit 3 can be prevented from being released, and the designed unit 2 can be prevented from falling off in the vehicle interior.

In the third embodiment, the spacers 4B are composed of two pieces with the same structure, and accordingly, a shape of the spacers 4B can be miniaturized, and weight of the spacers 4B can be reduced, leading to cost reduction.

Other Embodiments

It should not be understood that the descriptions and the drawings, which form a part of the disclosure of the above-mentioned embodiments, limit the present invention. From this disclosure, various alternative embodiments, examples and operation technologies will be obvious to those skilled in the art.

For example, in the above-mentioned respective embodiments, such a structure is adopted, in which the engaged portions 38a are installed on the lower ends of the suspended portions 38b. However, the present invention is not limited to this structure as long as the engaged portions 38a are composed so as to be capable of being engaged and disengaged with the engagement hooks 26.

Moreover, in each of the above-mentioned embodiments, such a structure is adopted, in which the spacer is the spacer 4 or 4B having the substantial U shape, or is the two spacers 4B, and the engagement between the engaged portions 38a and the engagement hooks 26 on two spots of each of the left and right sides is prevented from being released. However, the present invention is not limited to this structure as long as the engagement between the engaged portion 38a and the engagement hook 26 on at least one spot can be prevented from being released.

What is claimed is:

1. A vehicle interior illumination lamp unit, comprising:
   a designed unit disposed on a lower side of a ceiling plate of a vehicle;
   a functional unit disposed on an upper side of the ceiling plate and assembled with the designed unit in a state of sandwiching the ceiling plate there between by being coupled to the designed unit through an attachment hole formed in the ceiling plate;
   an engagement hook provided on a side plate of the designed unit, the engagement hook protruding sideward;
   an elastically deformable operation plate provided in the functional unit, having an engaged portion engaged with the engagement hook; and
   a spacer abutting on a surface of the operation plate, the surface being opposite with the a surface opposite to the side plate, and the spacer inhibiting the engaged portion from being released from the engagement hook.

2. The vehicle interior illumination lamp unit according to claim 1,
   wherein the spacer includes an engagement portion for dropout prevention thereon.

3. The vehicle interior illumination lamp unit according to claim 2,
   wherein the engagement portion for dropout prevention is provided on a tip end of the spacer, the tip end facing to the designed unit side.

4. The vehicle interior illumination lamp unit according to claim 1,
   wherein the functional unit is formed with a die cut hole for molding the engaged portion, and the spacer covers the die cut hole.

5. The vehicle interior illumination lamp unit according to claim 1,
   wherein the functional unit includes a grounding bus bar, and
   wherein the spacer includes a contact terminal portion formed of a conductive member and brought into contact with the grounding bus bar of the functional unit.

6. The vehicle interior illumination lamp unit according to claim 5,
   wherein the spacer is directly fixed to a vehicle body by a screw.

* * * * *

UNITED STATES PATENT AND TRADEMARK OFFICE
CERTIFICATE OF CORRECTION

| | | |
|---|---|---|
| PATENT NO. | : 7,775,694 B2 | Page 1 of 1 |
| APPLICATION NO. | : 12/204943 | |
| DATED | : August 17, 2010 | |
| INVENTOR(S) | : Kentaro Nagai et al. | |

It is certified that error appears in the above-identified patent and that said Letters Patent is hereby corrected as shown below:

\*In claim 1, column 10, line 46, "there between" should read --therebetween--.

In claim 1, column 10, line 56, "with the a surface" should read --with a surface--.

Signed and Sealed this

Seventh Day of December, 2010

David J. Kappos
*Director of the United States Patent and Trademark Office*